United States Patent [19]

Amon et al.

[11] Patent Number: 4,597,793

[45] Date of Patent: Jul. 1, 1986

[54] DESENSITIZING INK FOR WET OFFSET PRINTING

[75] Inventors: Albert Amon; Roger M. Weil, both of Lausanne, Switzerland

[73] Assignee: Sicpa Holding S.A., Prilly-Lausanne, Switzerland

[21] Appl. No.: 472,110

[22] Filed: Mar. 4, 1983

[30] Foreign Application Priority Data

Mar. 5, 1982 [CH] Switzerland ........................ 1345/82

[51] Int. Cl.[4] ........................................ C09D 11/00

[52] U.S. Cl. ........................................ 106/21; 106/20; 346/200; 427/150; 427/151; 427/152; 428/207; 428/411.1; 428/914

[58] Field of Search ............................ 106/21, 23, 20; 282/27.5; 427/150, 151, 152; 428/207, 914, 411; 346/200

[56] References Cited

U.S. PATENT DOCUMENTS 4,101,690 7/1978 Miyamoto et al. ................ 427/150

FOREIGN PATENT DOCUMENTS 167412 12/1981 Japan .
157471 12/1981 Japan .
49677 3/1982 Japan .
74193 5/1982 Japan .
109871 7/1982 Japan .
2051672 1/1981 United Kingdom .

OTHER PUBLICATIONS

Research Disclosure of Ciba Geigy, Oct. 10, 1982.

*Primary Examiner*—Amelia B. Yarbrough
*Attorney, Agent, or Firm*—Lieberman, Rudolph & Nowak

[57] ABSTRACT

In a desensitizing ink for the wet offset printing of a given area of the acceptor surface of a duplicating set containing an alkoxylated nucleophilic compound, preferably having a molecular weight lying in the range of from 2000 to 4000 and having a hydrophilic-lipophilic balance (HLB) of from 3 to 6, emulsified water is added to the mass of ink.

This rapidly forms a fine stable emulsion of water in the ink which is favorable for continuous wet offset printing.

12 Claims, No Drawings

DESENSITIZING INK FOR WET OFFSET PRINTING

The present invention relates to a desensitising ink for wet offset printing on an acceptor surface of a chemical duplicating set having at least two superimposed sheets, one of the facing surfaces of which has an electrophilic acceptor coating and the other a nucleophilic coating capable of producing a chromogenic reaction with said electrophilic acceptor.

Duplicating sets are known which comprise a first sheet, the back of which is covered with microcapsules containing a colourless nucleophilic dye and a second sheet underlying the first sheet and having on its front side an electrophilic acceptor layer. As a result of being struck by the type bar of a typewriter or the pressure of a writing instrument on the front side of the first sheet, the microcapsules burst and a coloured reaction takes place between the colourless nucleophilic dye and the electrophilic acceptor. Thus, typing or writing on the first sheet is reproduced on the second sheet.

There are circumstances when it is desirable to prevent this reaction from taking place in certain zones of the surface of the second sheet. In order to do this, the desired zones of the acceptor surface are desensitised by printing with a nucleophilic ink.

The main printing processes used for application of the desensitising ink on duplicating paper are as follows:

The letterpress printing process uses a form containing raised characters or raised surfaces. This relief enables contact to be made between the characters and the surfaces which are to be inked while avoiding inking the spaces which are not raised. The printed and unprinted parts of a sheet, and in the case of desensitisation, the desensitised zones (which do not react with the dye in the microcapsule) and the nondensensitised zones (which react with the dyes and are thus chromogenic), are differentiated in this way.

Because of the pressures of several tens of atmospheres which are required by the letterpress process there is a risk of bursting the microcapsules on the CB face (the back of the first sheet). This process is therefore not greatly recommended for the application of desensitising agent.

The dry offset printing process uses a relief plate on which the surfaces which are to be printed are raised. These surfaces are inked with ink which is transferred onto a rubber press-blanket which in turn deposits the ink on the paper.

This process requires much less pressure to transfer the ink onto the front of a sheet which has microcapsules on the back (CFB). Thus, the risk of bursting the microcapsules is considerably diminished.

The wet offset or lithographic printing process uses a metal, planographic plate on which the regions which are to be printed are oleophilic and the regions which are not to be printed are hydrophilic. An ink duct followed by an inking rollers supply the oleophilic regions while a water duct and dampening rollers keep the hydrophilic regions moist.

A balance has to be struck between the supply of ink and water to the plate, in addition to the balance for the possible emulsion of water in ink and sometimes that of ink in water. These equilibria insure the sharpness of the print and are physically and chemically related to the hydrophilic-lipophilic balance (HLB).

In wet offset printing the oleophilic regions of the plate take the ink which is then transferred onto a rubber blanket for final deposition onto the acceptor surface (CF) of the duplicating system.

The wet offset process thus makes it possible to 1. apply the required amount of ink onto the parts of the acceptor surface (CF) which is to be desensitized;
2. ensure the printing of an uniform film of ink with sharp outlines;
3. saturate the acceptor surface (CF) with a sufficient amount of ink to ensure complete desensitisation of the acceptor with smaller amounts of densensitizing ink than are required by letterpress or dry offset printing. In fact, complete desensitisation of the acceptor surface (CF) is related to the amount of ink necessary for saturation of the acceptor layer. This volume takes into account the quantity of emulsified water into the ink which contributes to an increase of its total volume;
4. ensure better penetration of the desensitising ink into the acceptor layer (whence better desensitising performance, because the formation of a coloured veil or coloured points occurs in regions deep within the acceptor layer). In fact the presence of an emulsion of water in the ink reduces the viscosity and this decrease is larger the more water is emulsified in the ink; and
5. reduce considerably the risk of breaking the microcapsules in one sheet (CFB) when printing on the front of the sheet using lesser pressures than in the letterpress process.

Among the dampening systems used in wet offset printing consideration must be given to the direct or conventional dampening in which the plate is wetted by a dampening roller soaked with dampening water. The plate is then placed in contact with the inking roller which deposits ink on the oleophilic surfaces only, as the hydrophilic surfaces have been wetted. These two operations take place during each cycle of the plate, thus in normal printing at rate of 4,000 to 10,000 times per hour.

The speed of these two successive operations always causes a certain amount of water to get into the ink, whence the need for the ink to tend to emulsify the water, the amount of water which can be accepted being limited (in relation to the HLB). The reverse emulsion, that is to say the emulsion of ink in water, is an exceptional phenomenon which results in the undesirable phenomenon of "tinting".

Consideration has also to be given to indirect dampening, also known as "Dahlgren", in which the first inking roller is in contact with the dampening roller. The first inking roller is responsible for providing most of the water to supply the hydrophilic regions on the plate. The dampening water is in an incompletely emulsified state. This emulsified state is promoted by adding an alcohol or polyol to the dampening water to reduce the surface tension of the water. In this wetting process accurate equilibria preside to the supply of water and ink (related to the HLB).

U.S. Pat. No. 3,952,117 describes a desensitising ink containing a polypropylene glycol (PPG) having an average molecular weight of 400–5,000 which is intended for letterpress or dry offset printing.

According to DE OS No. 2,526,592 adducts of ethylene oxide and/or propylene oxide on aliphatic amines, for example adducts of propylene oxide with triethylene tetramine, tetraethylene pentamine or tetrapropylene pentamine which are then esterified or etherified, are used. These products have a molecular weight of less than 1,000 and are intended for letterpress and dry offset printing.

According to U.S. Pat. No. 4,101,690 desensitising adducts are used which are block copolymers of ethylene oxide and propylene oxide with polyethylene polyamines which cannot be used in wet offset printing, due to their water solubility.

In German Patent DE PS No. 21 45 641 desensitising efficiency resides in adducts of propylene oxide with alkylene diamines. These products also fail to produce inks which can be used in wet offset printing.

The chemical composition of the desensitising products or of the examples of inks quoted in these patents does not enable them to be used in wet offset printing because of the delicate water/ink balance required for wet offset printing which has not been taken into consideration.

U.S. Pat. No. 4,078,493 mentions the impossibility of formulating a desensitising ink for conventional wet offset (or letterpress) printing and proposes that special lithographic plates should be used in which the printing regions are hydrophilic and the non-printing regions are lipophilic. This is therefore a reversed lithographic process.

Our U.S. Pat. No. 4,287,234 describes desensitising inks containing alkoxylated derivatives which have the hydrophilic-lipophilic balance (HLB) required for wet offset printing. Adducts of ethylene oxide with octyl or nonyl phenol, polypropylene glycol and block copolymers of ethylene oxide and propylene oxide are mentioned as alkoxylated derivatives having desensitising properties.

In order to ensure continuous transfer of ink from the inking rollers in the hydrophobic regions and a simultaneous supply of dampening water to the hydrophilic zones of an offset printing plate, the desensitizing ink according to the invention includes an alkoxylated nucleophilic compound and emulsified water within the ink bulk.

In the case where a second addition of water is required to ensure optimum saturation of the hydrophilic regions of the offset plate with water, the emulsified water in the ink and the water from the dampening system of the offset press enable the setting of the quantity of ink and the water-ink balance to be adjusted more rapidly and stabilised more easily, particularly when printing with a substantial ink film thickness.

In the case where the ink contains sufficient emulsified water to ensure optimum saturation of the hydrophilic regions of the offset plate with water no additional provision of water from the dampening device of the offset press is required. Actually, the microemulsification of water in oil creates droplets of 0.1 to 1 micron size. The microemulsion thus obtained produces an increase of viscosity with corresponding improvement of the tack of the ink.

Once the concentration of emulsified water in the ink exceeds 20%, it is possible to print without providing dampening water from the dampening system. The ratio between oleophilic regions (ink) and hydrophilic regions (water) must obviously be taken into account.

When this ratio is favourable, that is to say when the regions which are to be desensitised represent at least 20% of the total surface, the supply of water contained within the ink is sufficient to moisten the non-printing regions of the plate.

The alkoxylated nucleophilic liquid preferably has a molecular weight (MW) of more than 700 since propoxyl derivatives of MW below 700 are partly soluble in water and may have a desensitising effect over the entire surface of the printed sheet in contact with the wetting water of the plate. The MW of the alkoxylated liquid is generally from 700 to 10,000 and, more specifically, from 2,000 to 4,000.

When the limitations described above are taken into account, printing on an offset printing machine without using the dampening system provides good results and print runs can be started quickly.

The ink contains an alkoxylated nucleophilic compound having a water/ink balance (HLB) of from 0 to 8 and, more specifically, from 3 to 6.

Details of the HLB will be given below. The presence of emulsified water in the bulk of the ink does not alter the HLB value, given that HLB tests are conducted in the presence of an excess of water. On the other hand the rate of emulsification and prevention of the shock caused by the mixing of two liquids which are poorly soluble in each other are favourably affected by the presence of water already emulsified in the ink.

The chemical nature of the alkoxylated nucleophilic derivative, which has desensitizing ability, may comprise:

a homopolymer of propylene oxide (e.g. polypropylene glycol (MW 4000));

or a block copolymer of propylene oxide and ethylene oxide, in which the ethylenic fraction does not exceed 20% of the copolymer (e.g. a block copolymer of 90% propylene oxide and 10% ethylene oxide (MW 2,500));

or a polyalkoxylated, preferably polypropoxyl, alkyl phenol (e.g. nonyl phenol polypropoxyl);

or a polyalkoxylated, preferably polypropoxyl, substituted or unsubstituted, saturated or unsaturated fatty acid (e.g. propoxyl $C_{12}$ fatty acid);

or an adduct of a primary or secondary amine, of an alkylene or polyalkylene polyamine, of a polyimine with a mixture of an alkylene oxide, preferably propylene oxide (e.g. propoxylated ethylene diamine MW 3,500, propoxylated diethylene triamine, MW 4,000);

or a polyalkoxylated, preferably polypropoxylated, organic derivative.

As a result of the presence of amino or imino groups in the propoxylated adduct, the product has greater neutralizing or desensitizing effect than the homopolymers of propylene oxide or the block copolymer of ethylene oxide and propylene oxide mentioned in U.S. Pat. No. 4,287,234. Comparative tests made with different CB (coated back=surface coated with microcapsules) on different CF (coated front=surface coated with acceptor) have shown that, in a large number of cases, the desensitization performed with desensitizing ink based in non-aminated or non-iminated products was incomplete and a visible veil was noticable.

These products have a more powerful desensitizing effect than non-aminated propoxylated compounds due to their greater affinity for electrophilic acceptors, resulting in a stronger bond between the acceptor and the desensitizing agent than in the case of non-aminated compounds.

This neutralising ability can be achieved by using polypropylene glycol to which a solid or liquid aminated derivative or heterocyclic azo-derivative has been added during preparation of the varnish. This additive can be slightly soluble or insoluble in water. By way of an example there is mentioned (2(2'-hydroxy-3',5'-di-ter-butylphenyl)-benzotriazole in a proportion of from 1 to 10 parts of the total amount of ink.

The alkoxylated nucleophilic derivative represents from 10 to 60% of the desensitizing ink.

In addition to the desensitising alkoxylated nucleophilic liquid the binder of the desensitising ink contains resins which are insoluble in water but soluble in the alkoxylated nucleophilic liquid, generally by dissolution with heating The preferred resins are as follows:

(a) Colophane and its derivatives in all forms, e.g. hydrated, dimerised or polymerised colophane, colophane esterified with monoalcohols or polyalcohols, with resin forming agents such as acrylic acid and butynediol or maleic acid and pentaerythritol, modified colophane resin, the calcium or zinc salts of colophane, abietic acid and its esters, resins based on acrylic compounds, as well as other natural resins such as modified linseed oil or shellac;

(b) Maleic resins, oil-free alkyd resins, styrolised alkyd resins, alkyd resins modified with vinyl toluene, alkyd resins from synthetic fatty acids, alkyd resins from linseed oil, alkyl resins from soya oil, alkyd resins from coconut oil, alkyd resins from tall oil and table oil and acrylic alkyd resins;

(c) Terpenic resins; and (d) Phenolic resins.

In addition thereto, the desensitising ink may contain conventional pigments such as titanium dioxide, barium sulphate, magnesium carbonate, basic magnesium carbonate, magnesium hydroxide, calcium carbonate, barium carbonate, bentonite or talc, and these may also be coated with a resin or a wax.

The desensitising ink may also contain a solvent which is slightly soluble or insoluble in water and is compatible with the neutralising agent and the resin.

The desensitising inks so obtained are printed using the wet offset process onto the acceptor coated face of the sheet, with or without the provision of dampening water.

The acceptor surface (CF) contains the normal electrophilic acceptors. These include, for example, clays such as acid clays, activated clays, attapulgite, zeolite, kaolin, montmorillonite, pyrophylite, or phenolic resins, in particular phenolaldehyde resins, or polymers and organic acids, in particular aromatic carboxylic acids or polymeric organic acids and their metal salts, in particular the zinc salts of organic acids.

The other sheet of the duplicating set (CB) contains a nucleophilic compound, also known as the colour generator or chromogen, which is dissolved in a liquid and contained in microcapsules.

Normal leuco (colourless) derivatives such as compounds of triaryl methane, diphenylamine, derivatives of xanthene, thiazine, spiropyrane or similar compounds are used as chromogens.

The appropriate chromogen concentration may lie within the range of from 1 to 10% by weight, preferably from 1 to 3% by weight. The solution contained in this way is then encapsulated.

Given that the HLB value of the desensitising ink according to the invention has a determining role, an explanation of it is required. The HLB value specifies the balance between the hydrophilic and lipophilic groups in a substance. The scale runs from 0 (a wholly lipophilic substance) to 20 (a wholly hydrophilic substance). Reference should be made to known bibliographic sources for determination of the HLB value, for example:

Surfactant adduct of ethylene oxide. Dr. Niklaus Schonefeld, Wissenschaftliche Verlangs GmbH., Stuttgart, 1976, p. 209–218.

The Atlas-HLB system, a modern method for the investigation of appropriate emulsifying systems. Atlas Chemie GmbH-43 Essen 1-Germany (1971).

In "Rumanische Chemische Revue" 1975, 22 (8), p. 117–1123 Leca et al. compare:

The hydrophilic-lipophilic balance (HLB). (Griffin, J. Soc. Cosmetic Chemists 1949, 1, p. 311).

The hydrophilic-lipophilic index (HL). (V. R. Huebner, Anal. Chem. 1962, 34, p. 488).

The polarity index (PI), (V. R. Anebner, Anal. Chem. 1962, 34, p. 488) and find that the most useful system is the HLB system, which offers the advantage of additiveness in the case of mixtures.

The HLB of an "oil in water" emulsion (HLB O/W) is distinguished from the HLB of a "water in oil" emulsion (HLB W/O). The latter mainly comes into play with printing inks in the wet offset process, where the problem of the formation and the stability of a "water in oil" emulsion arises; in this case W represents the dampening water protecting the unprinted surfaces and O indicates the printing ink which provides ink to the surfaces which are to be printed.

An ink which is printed by the wet offset process must have both strongly lipophilic behaviour and a sufficiently hydrophilic tendency to emulsify a certain amount of water, that is to have a suitable HLB (W/O) value.

This HLB (W/O) lies in the range from 0 to 8, preferably from 3 to 6.

The test made for determining the suitability of the water in oil emulsion is as follows:

The following are stirred for a few minutes in a beaker:

80 parts of oil (O)
20 parts of water (W)
5 parts of emulsifier

Here "oil" means a lipophilic product such as:

linoleic acid
bleached linseed oil
refined mineral oil, or
dioctyl phthalate.

This is allowed to stand for several hours and the emulsion in the oil (O) phase is observed.

After having subjected the emulsifying materials to known tests to determine the HLB (W/O) scale, the HLB (W/O) value of the products used for the manufacture of neutralising ink at the different stages of semi-finished products such as:

propoxylated compound (liquid)
basic ink varnish (very viscous liquid)
desensitizing ink is determined.

HLB (W/O) values for different products

| | | Abbreviation | HLB (W/O) value (±1) |
|---|---|---|---|
| a | Lipophilic product | | |
| | Linseed fatty acid | | 4 |
| | Linseed Oil | | 4 |
| | Mineral oil | | 4 |
| | Dibutyl phthalate | | 4 |
| b | Propoxyl compounds | | |
| | Propylene glycol 4000 | PPG | 2 |

-continued

HLB (W/O) values for different products

| | | Abbreviation | HLB (W/O) value (±1) |
|---|---|---|---|
| | Propoxylated diethylene triamine 4000 | PDETA | 3 |
| | Propoxylated triethylene tetramine 4000 | PTETA 6 | |
| | Propoxylated tetraethylene pentamine 4000 | PTEPA | 6 |
| c | Varnish based on: | | |
| | PPG | | 2 |
| | PDETA | | 2 |
| | PTETA | | 4 |
| | PTEPA | | 4 |
| | Linseed oil | | 3 |
| | Linseed oil and mineral oil | | 4 |
| d | Ink based on: | | |
| | PPG | | 3 |
| | PDETA | | 4 |
| | PTETA | | 6 |
| | PTEPA | | 6 |
| | Linseed Oil | | 3 |
| | Linseed oil and mineral oil | | 4 |

When an offset ink has a HLB (W/O) value which is too high, too much emulsified water is present in the ink, there is even a tendency for the ink to become emulsified in water and sometimes attain values which would justify a HLB (O/W), whence the phenomenon of "tinting".

The examples below explain the process of the preparation of the ink according to the invention. The proportions indicated are expressed as parts by weight.

EXAMPLE 1

Varnish A 40 parts of an acid phenolic resin are dissolved hot in 60 parts of polypropylene glycol (molecular weight 4000).

Desensitizing Ink A 73 parts of varnish A are ground with 11 parts of titanium oxide, 3 parts of silica and 6 parts of calcium carbonate in a three roll 00; mill. 7 parts of water, which are emulsified by mixing are added to this ground ink. The HLB value of the ink is 3(±1). This ink has adequate flow properties for wet offset printing. The water/oil balance is rapidly and easily established for the addition of dampening water from the dampening system. The printed product has sharp outlines and the amount of desensitizing ink applied is sufficient for complete desensitization of the printed area of the acceptor layer of the duplicating set (CF or CFB).

EXAMPLE 2

Varnish B 30 parts of an acid phenolic resin are dissolved hot in 70 parts of propoxylated diethylene triamine (molecular weight 4000).

Desensitising Ink B 56 parts of varnish B are ground with 11 parts of titanium oxide, 3 parts of silica and 6 parts of calcium carbonate in a three roll mill. 24 parts of water, which are emulsified by mixing, are added to this ground ink.

The HLB value of the ink is 4(±1). This ink has aequate flow properties for wet offset printing. The water/oil balance is rapidly and easily established by the addition of dampening water from the dampening system. The printed product has sharp outlines and the amount of desensitizing ink applied is sufficient for complete desensitization of the printed area of the acceptor layer of the duplicating set (CF or CFB).

EXAMPLE 3

Varnish C 30 parts of an acid phenolic resin are dissolved hot in 70 parts of propoxylated triethylene tetramine (molecular weight 4000).

Desensitising Ink C 64 parts of varnish C are ground with 11 parts of titanium oxide, 3 parts of silica and 6 parts of calcium carbonate in a three roll mill. 16 parts of water, which are emulsified by mixing, are added to this ground ink.

The HLB value of the ink is 6(±1). This ink has adequate flow properties for wet offset printing. The water/oil balance is rapidly and easily established by the addition of dampening water from the dampening system. The printed product has sharp outlines and the amount of desensitizing ink applied is sufficient for complete neutralisation of the printed area of the acceptor layer of the duplicating set (CF of CFB).

EXAMPLE 4

Desensitizing Ink D 64 parts of varnish B are ground with 11 parts of titanium oxide, 3 parts of silica and 6 parts of calcium carbonate in a three roll mill. 16 parts of water, which are emulsified by mixing, are added to this ground ink.

The HLB value of the ink is 5(±1). This ink has adequate flow properties for wet offset printing. The water/oil balance is rapidly and easily established by the addition of dampening water from the dampening system. The printed product has sharp outlines and the amount of desensitizing ink applied is sufficient for complete neutralisation of the printed area of the acceptor layer of the duplicating set (CF or CFB).

EXAMPLE 5

Varnish E 45 parts of a neutral esterified colophane resin are dissolved hot in 55 parts of polypropylene glycol (molecular weight 2500).

Desensitising Ink E 73 parts of varnish E are ground with 11 parts of titanium oxide, 3 parts of silica and 6 parts of calcium carbonate in a three roll mill. 7 parts of water, which are emulsified by mixing, are added to this ground ink.

The HLB value of the ink is 3(±1). This ink has adequate flow properties for wet offset printing. The water/oil balance is rapidly and easily established by the addition of dampening water from the dampening system. The printed product has sharp outlines and the amount of desensitizing ink applied is sufficient for complete neutralisation of the printed area of the acceptor layer of the duplicating set (CF or CFB).

EXAMPLE 6

Varnish F 30 parts of an acid phenolic resin are dissolved hot in 60 parts of polypropylene glycol (molecular weight 4000), and then 10 parts of the benzotriazole derivative are added hot.

Desensitising Ink F 70 parts of varnish F are mixed with 11 parts of titanium oxide, 3 parts of silica and 6 parts of calcium carbonate in a three roll mill. 10 parts of water, which are emulsified by mixing, are added to this ground ink.

The HLB value of the ink is 4(±1). This ink has adequate flow properties for wet offset printing. The water/oil balance is rapidly and easily established by the addition of dampening water from the dampening system. The printed product has sharp outlines and the amount of desensitizing ink applied is sufficient for complete neutralisation of the printed area of the acceptor layer of the duplicating set (CF or CFB).

We claim:

1. A desensitising ink for wet offset printing on an acceptor surface of a chemical duplicating set having at least two superimposed sheets, one of the facing surfaces of which has an electrophilic acceptor coating and the other a nucleophilic coating capable of producing a chromogenic reaction with said electrophilic acceptor coating, wherein the desensitising ink comprises an alkoxylated nucleophilic compound and emulsified water within the ink bulk, the amount of said emulsified water in said ink bulk being sufficient for at least partial wetting of the hydrophilic areas of an offset printing plate.

2. A desensitising ink as claimed in claim 1, in which the amount of emulsified water in the ink bulk is sufficient to ensure optimum saturation of the hydrophilic areas of an offset printing plate.

3. A desensitising ink as claimed in claim 1, in which the alkoxylated nucleophilic compound has a water/ink balance (HLB) value of from 0 to 8.

4. A desensitising ink as claimed in claim 3, in which the alkoxylated nucleophilic compound has a water/ink balance (HLB) value of from 3 to 6.

5. A desensitising ink as claimed in claim 1, in which the alkoxylated nucleophilic compound has a molecular weight of from 700 to 10,000.

6. A desensitising ink as claimed in claim 1, in which the alkoxylated nucleophilic compound has a molecular weight of from 2,000 to 4,000.

7. A desensitising ink as claimed in claim 1, in which the nucleophilic compound is a polypropoxylated organic derivative.

8. A desensitising ink as claimed in claim 1, in which the nucleophilic compound is an adduct of a primary or secondary amine, an alkylene or polyalkylene polyamine or a polyimine with propylene oxide or a mixture of alkylene oxides.

9. A desensitising ink as claimed in claim 1 in which the ink contains an aqueous solution of a protective colloid emulsified within the mass of ink.

10. A desensitising ink as claimed in claim 9, in which the protective colloid is a water-soluble cellulose derivative.

11. A desensitising ink as claimed in claim 10, in which the protective colloid is carboxymethylcellulose.

12. A desensitising ink as claimed in claim 9, in which the concentration of water and protective colloid is from 1 to 40% of the total weight of the ink.

* * * * *